Jan. 11, 1966     H. K. EDENBOROUGH     3,228,478
CONTROL LAG COMPENSATOR FOR ROTARY WING AIRCRAFT
Filed April 29, 1964     3 Sheets-Sheet 1
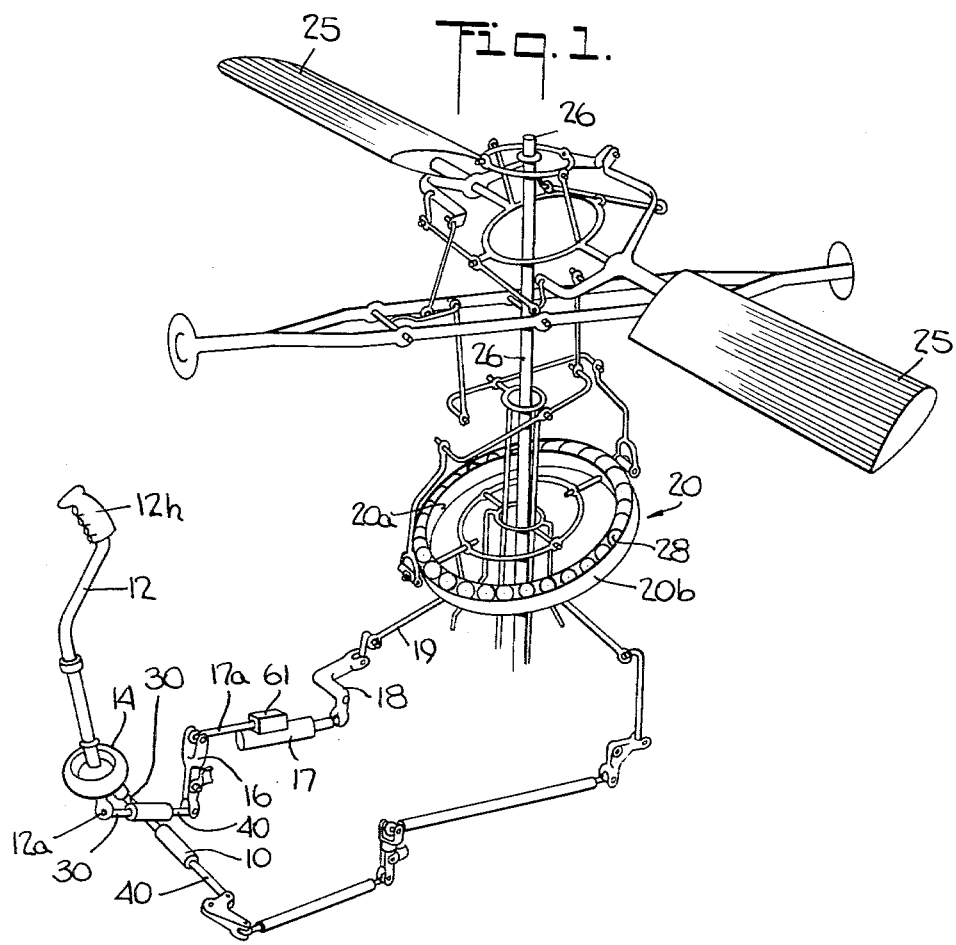
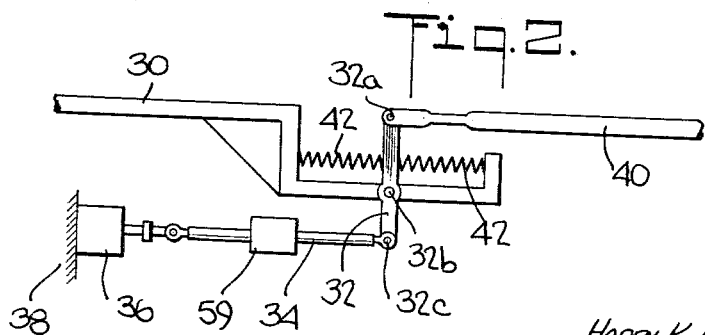
INVENTOR.
HARRY K. EDENBOROUGH
BY Kenyon & Kenyon
ATTORNEYS

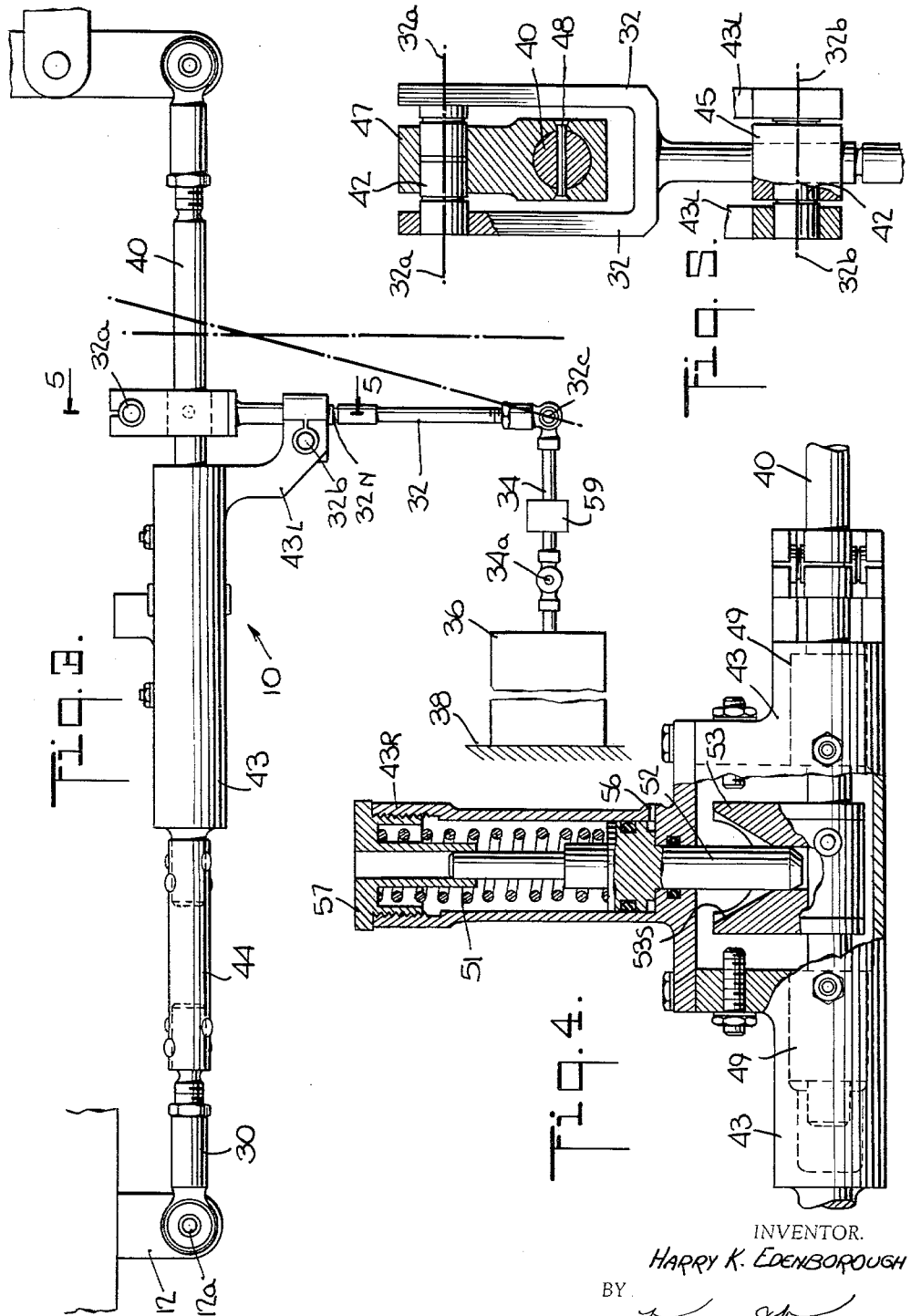

INVENTOR.
HARRY K. EDENBOROUGH
BY
ATTORNEYS

United States Patent Office 3,228,478
Patented Jan. 11, 1966

3,228,478
CONTROL LAG COMPENSATOR FOR ROTARY WING AIRCRAFT
Harry K. Edenborough, Dallas, Tex., assignor to Bell Aerospace Corporation, Wheatfield, N.Y., a corporation of Delaware
Filed Apr. 29, 1964, Ser. No. 363,567
12 Claims. (Cl. 170—160.26)

This invention relates to aircraft piloting and aircraft control systems and provides a means for obtaining a temporary overshoot of the control in response to pilot stick movement so as to compensate for the time lag between control stick movement and aircraft navigational response.

A problem to which this invention is addressed arises in connection with the articulated rotor helicopter and can best be understood by making initial reference to the rigid or non-articulated rotor helicopter. In the rigid rotor helicopter, the rotor is fixedly attached to the mast, and the mast fuselage move with the rotor as its attitude is controlled by the pilot. The fuselage consequently responds relatively rapidly to control stick movements providing a "feel" that is desirable from the pilot's point of view. Flights have shown that this rapid response aids the pilot during precision maneuvers, enhancing the maneuverability of the helicopter and making it easier to fly.

In the articulated rotor helicopter where the rotor is pivotally attached to the mast, the motor must first change attitude in response to pilot control and then impart a moment through the mast around the center of gravity of the helicopter before the fuselage will correspondingly change its attitude. This delay or lag between pilot control and fuselage response provides an undesirable "feel" to the pilot that is somewhat like driving an automobile which has a great deal of play in the steering wheel.

Some pilots learn to compensate for this lag by "over-controlling," that is, first moving the cyclic stick to a relatively extreme position and then returning it to a position generally corresponding to that which represents the desired velocity roll or pitch, as the case may be. In applying this "over-control," the pilot is reducing the aforementioned time lag between control action and fuselage response by imposing "excess" control moments on the fuselage and thus increasing the helicopter's rate of acceleration toward the final roll or pitch velocity.

With this in mind, it should be clear that the control stick position in the rigid rotor helicopter reflects the helicopter's actual roll or pitch velocity more closely than the control stick position in the articulated rotor helicopter. Accordingly, in the rigid rotor helicopter, the pilot flies on the basis of velocity or rate. In the articulated rotor helicopter he lies on the basis of acceleration which necessarily requires exercise by the pilot of a sense of anticipation. He must relate the rate of acceleration to the desired velocity and all of this leads to the comparatively undesirable "feel" of the articulated rotor helicopter.

A corollary to the rigid rotor's desirable rapid control response is its undesirable sensitivity to gusts for essentially the same reasons. The present invention is directed at providing the articulated rotor with the former quality without the latter.

It is a major purpose of this invention to provide a mechanical means for reducing the time lag between pilot control inputs and aircraft response.

It is a related object of this invention to increase the maneuverability of an articulated rotor helicopter.

It is another related object of this invention to provide the helicopter pilot with an improved feel for the navigation of the helicopter and to make the helicopter easier to fly.

It is a more specific purpose of this invention to provide a means in the navigational controls of an aircraft that will automatically provide an appropriate and temporary over-control in response to pilot control movement.

Other objects and purposes of this invention will become apparent from a consideration of the following detailed description and drawings in which:

FIG. 1 is a mechanical schematic of the cyclic pitch control system in an articulated rotor helicopter.

FIG. 2 is a mechanical schematic of the mechanism of this invention for obtaining control response lag compensation.

FIG. 3 is an elevation view of one embodiment of this invention.

FIG. 4 is a sectional view of a portion of the mechanism of FIG. 3 taken parallel to the plane of FIG. 3.

FIG. 5 is a sectional view of a portion of the mixing lever 32 of FIG. 3 taken along the plane 5—5 in FIG. 3.

Figure 6:
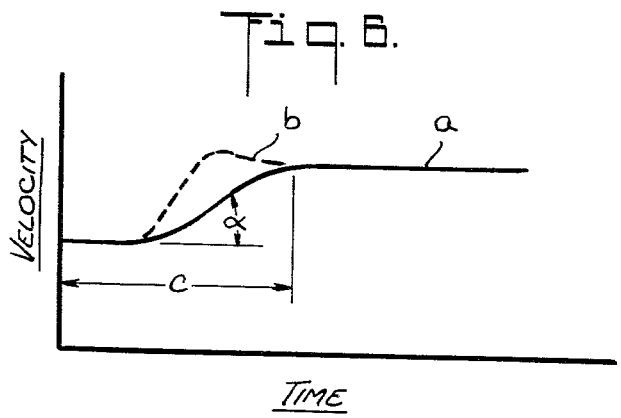
FIGS. 6 and 7 are curves illustrating velocity versus time relationships of the aircraft response with and without use of the present invention.

FIG. 1 primarily establishes the setting in which the lag compensator unit 10 of this invention is used. The cyclic control stick 12 extends through a universal mount 14 which mount 14 establishes a pivot point about which the control stick 12 rotates. The mount 14 is connected to the fuselage so that when the handle 12h of the stick 12 is moved to the left (in FIG. 1) then the lower end 12a of the stick will move to the right. Movement of the end 12a of the stick 12 is translated through the lag compensator unit 10 of this invention and the various members 16, 17, 17a, 18, 19 and 61 tilt the inner and non-rotating portion 20a of the swashplate 20. Member 61 is the control valve for the hydraulic boost 17, the other and various portions of the hydraulic boost system well known in the art need not be described herein.

The outer portion 20b of the swashplate 20 is connected, through various linkages, to the helicopter rotor blades 25, which blades 25 in turn are linked to and powered by the rotating mast 26. The rotating portion 20b of the swashplate 20 rotates about the non-rotating portion 20a on ball bearings 28. When the swashplate 20 tilts in response to movement of the control stick 12, the cyclic pitch of the rotor blades 25 is changed and thus the direction in which the helicopter proceeds is controlled.

The lag compensator unit 10 replaces a rigid link that is used in the prior art design. It is the purpose of this invention to replace one of the rigid links with the lag compensator unit 10 so as to continue to tilt the swashplate 20 in accordance with motion of the cyclic control stick 12 and also to provide a temporary over-compensation which will tilt the swashplate 20 more than is required for steady state performance in order to overcome the fact that there is a time lag between the tilting of the swashplate 20 and the control achieved by the resulting attitude change in the rotor blades 25.

Although two lag compensator units 10 are employed, they are identical in structure and performance so that only one need be described.

FIG. 2 provides a mechanical schematic for understanding the operation of the lag compensator link 10 of this invention. The rod 30 of FIG. 2 is pivoted at its left end (not shown in FIG. 2) to the end 12a of the cyclic control stick 12 so that motion of the stick 12 will result in horizontal movement of the rod 30. If we assume that the rod 30 moves to the right (in FIG. 2) by a unit amount in response to a given control stick 12 movement, then the point 32b on the lever 32, which is pivotally mounted to the rod 30 at point 32b, will also move to the right by that unit amount. The bottom 32c of the lever 32 is pivotally mounted to a damper rod 34 leading to a damper 36 that in turn is mounted to the air frame 38. Because the lower end of the lever 32 is linked to the damper 36, the lower end 32c will resist movement to the right in response to the movement of the rod 30 and thus will provide a temporary pivot point about which the lever 32 may rotate. Accordingly, the upper end 32a of the lever 32 rotates about the point 32c and thus moves to the right a distance that is considerably greater than the unit distance which the rod 30 and point 32b moves to the right.

The rod 40 is pivotally mounted at one end to the end 32a of the lever 32 and is connected at its other end to the links (such as the link 16 in FIG. 1) that control the tilt of the swashplate 20. Thus the rod 40 will move to the right by an amount that is appreciably greater than the unit movement of the rod 30 and will thus provide the desired over-control of the swashplate 20. This will cause the lever 32 to be inclined (that is, not perpendicular) with respect to rod 30. As the springs 42 (illustrated as tension springs in FIG. 2 and flexural pivot springs in FIG. 5) are designed to hold the lever 32 in a position that is substantially perpendicular to the main axis of the rod 30, the springs 42 will apply a moment tending to cause the lever 32 to rotate back to a position where it is perpendicular to the rod 30. The time it takes for the lever 32 to rotate back to this perpendicular position will depend upon the strength of the springs 42 and the stiffness of the damper 36. The proper relationship of spring strength to damper stiffness will be determined for the particular helicopter to which the invention may be applied. In any case, the rod 40 which initially was moved to the right by an amount greater than the movement to the right of the rod 30 will be pulled back to the left by the amount of the overshoot so that the rod 40 will ultimately come to rest in a position where it retains its spatial relationship to the rod 30.

In this fashion, the action of the damper 36 causes the rod 40 to initially overshoot and thus over-control the swashplate 20 while the action of the restoring springs 42 will cause the rod 40 to ultimately return to a position proportional to the movement of the rod 30.

FIGS. 3, 4 and 5 illustrate a specific embodiment of this invention. In describing the lag compensator link 10 embodiment illustrated in FIGS. 3-5, the reference numerals used in connection with the schematic description of FIG. 2 will be used for corresponding parts of the FIG. 3 embodiment to as great an extent as is possible in order to draw a parallel between the schematic description and the actual embodiment illustrated.

The rod 30 that is connected to the control stick 12 is rigidly connected to a housing 43 by means of a tube 44. The housing 43 has a leg 43L which is pivotally connected to the lever 32 at the point 32b. Thus any movement of the rod 30 along its major axis will result in identical horizontal movement of the leg 43L and of the pivot point 32b.

Actually, as may be seen from FIGS. 3 and 5, the pivot point 32b (which is indicated as the pivoting axis 32b in FIG. 5) is offset from the lever 32. Lever 32 is slidably mounted within sleeve 45 so that as the lever 32 pivots, it is free to slide along its axis relative to the housing 43. Thus the lever 32 is pivotally mounted with respect to housing 43 through the direct pivoting attachment of sleeve 45 in housing 43. Accordingly, the pivot point 32b is in fact not a point on the lever 32 but may actually move relative to the lever 32 for a short distance as the lever 32 pivots. However, this variation in the position of the pivot point 32b is immaterial to the inventive concept and has only a second order effect on the magnitude of the overshoot.

The lower portion of the lever 32 is pivoted at point 32c to a damper rod 34 which in turn leads to a damper 36 that is mounted to the air frame 38. The weight 59 is attached to damper rod 34. The pivot point 34a permits the rod 34 to swing appropriately in response to pivoting of the lever 32.

The upper portion of the lever 32 is pivotally mounted at the point 32a to bracket 47, which bracket 47 is pinned by pin 48 to the rod 40. Thus, through the bracket 47, the lever 32 is pivotally connected to the rod 40.

The rod 40 is mounted by means of ball bushings 49 within the housing 43 so that the rod 40 is maintained substantially coaxial with the rod 30 but is free to move along its axis relative to the rod 30.

Figure 7:
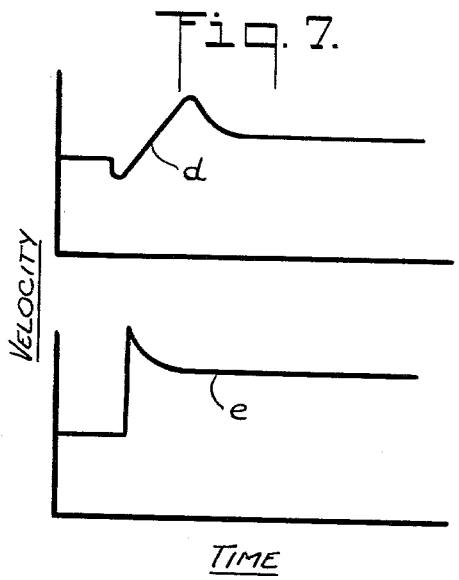

Weight 59 supported on damper arm 34 serves as an inertia counterbalance against that portion of the control system on the side of the pivot 32b to which rod 40 is attached. If that portion of the control system has a much greater inertia than the portion of the system on the other side of pivot 32b (which includes rod 34), sharp control inputs by the pilot will initially react against this higher inertia and overpower the damper 36, causing the control to initially react opposite to the intended manner, as indicated by cure "d" of FIG. 7. Clearly, the desired amount of weight 59 will depend upon the comparative inertias in the two portions of the control system on either side of pivot 32b. If the weight 59 is such as to cause the inertia of the system on the damper side of the pivot 32b to be greater, then the overshoot function of the device will be accentuated and its effectiveness will be dependent upon the ratio of sharpness or acceleration of pilot input to the speed or rate of input effect contributed by the damper 36. In this case control response as indicated by cure "e" in FIG. 7 can be achieved.

The upper portion of FIG. 4 illustrates a mechanism for locking the rod 40 to the housing 43 thereby locking rod 40 to the rod 30 when it is desired to cut out the lag compensation device. This locking mechanism can be ignored for the purpose of understanding the operation of the lag compensator unit 10 and will be described further on. It might be kept in mind that FIG. 4 shows the piston 52 extended with the locking mechanism in a locked state and that the piston 52 is normally retracted.

With the above structural relationships in mind, it can be seen that a movement of the rod 30 (which will be in response to a movement of the cyclic control stick 12), for example, to the right as seen in FIG. 3, will result in an equal movement to the right of the pivot point 32b. Because of the lever point 32c being connected to the damper 36, this point 32c will initially resist a change in position and thus will act as a point about which the entire lever 32 will rotate when the pivot point 32b is moved. Thus a motion to the right of the pivot point 32b by a unit amount will result in a motion to the right of the point 32a by a unit amount plus an overshoot amount. Since the point 32a on the lever 32 is pivotally connected to the rod 40, the rod 40 will move to the right (along its own major axis) by an amount equal to the amount which the rod 30 moves to the right plus the overshoot. Accordingly, there will result an overcontrol of the swashplate 20 and the helicopter will tend to change its course by an amount greater than that dictated by the control stick 12.

However, as soon as he lever 32 has been forced to rotate about the point 32c, standard torsion springs 42 mounted at the pivot points 32a and 32b will create a moment tending to cause the lever 32 to restore itself to a vertical position. In this fashion the point 32a will be brought back to a position where the ultimate travel of the point 32a, and thus of the rod 40, will equal the change of position of the rod 30.

As previously noted, FIG. 4 illustrates a locking mechanism which permits locking out the overshooting mechanism by locking the rod 40 to the housing 43 and thus in effect locking the rod 40 to the rod 30. In the radial extension 43R of the housing 43 there is contained spring 51 and piston 52. The piston 52 is normally retracted, though in the position shown in FIG. 4 the piston 52 is shown extended. A bracket 53 having a funnel-shaped opening is pinned to the rod 40. When the piston 52 is extended, as shown in FIG. 4, it enters the V-shaped opening in the bracket 53 to hit one of the side walls 53S of the bracket 53 and thereby centers the bracket 53 so that the piston 52 can enter the opening 55 at the bottom of the V-shaped portion of the bracket. In this fashion, the rod 40 can be locked into position relative to the housing 43 and thus relative to the rod 30. When the rod 30 is moved by motion of the control stick 12, the rod 40 will move a corresponding amount without any overshooting or lag compensation. A port 56 in housing 43 permits introduction of fluid under pressure from the hydraulic control system, which pushes upwardly against the flanged portion of piston 52 so as to compress spring 51 and maintain the piston 52 in its normally retracted or unlocked position, the control valve 61 of this system being actuated by movement of rod 17a, as hereinabove described. If the hydraulic pressure should fail, or drop beneath a certain level, the compressed spring 51 will move piston 52 to its extended position and, in this fashion, the locking mechanism will be automatically actuated upon failure of the hydraulic system. This can be a significant safety feature as introduction of any overshoot to the controls by rod 40 is dependent upon a lesser proportion of resistance to the imposed force through rod 40 than through damper rod 34. In fact, if this proportion is greater in the former than in the latter, the overshoot will become an undershoot, subtracting from the control input. If the hydraulic system should fail, an undershoot might occur because rod 40 would then have to push against rotor loads of sufficient magnitude as to cause pivoting of rod 32 around point 32a instead of around point 32c.

Another safety mechanism that may be built into the lag compensation unit 10 is illustrated in FIG. 3 by the neck down area 32N on the lever 32. A safety rivet at this point 32N is designed to break under a pre-determined shearing force. If the damper 36 sticks, the result would be to increase the gearing between the control stick 12 and swashplate 20. If this condition is bothersome to the pilot, he can actuate the piston 52 to lock the rod 40 to the rod 30. Any further motion of the control stick 20 will shear the safety rivet at the position 32N and thus disconnect the damper 36 from the control system.

If the damper 36 becomes empty so that it does not provide an appropriate damping action, the centering torsion springs 42 will maintain the angle of the mixing lever 32 relative to the rod 40 and thus will assure normal uncompensated steering. If for some reason the operation of the torsion springs 42 is unsatisfactory, the pilot can actuate the locking mechanism illustrated in FIG. 4.

Another use for the FIG. 4 locking mechanism may arise if the centering torsion springs 42 fail so as not to cancel the overshoot, in which case the locking mechanism operates to bypass the springs 42.

No means are illustrated that permit the pilot to lock out the lag compensating device at will as this can easily be done in numerous ways well within the capabilities of persons in the art. For example, a pilot-actuated bypass valve may be inserted in the hydraulic line leading to port 56.

While the invention has been illustrated with respect to the cyclic control system of an articulated rotor, it also has significant application to the yaw or directional control system of a helicopter. Damping of yaw motion is of a relatively low order and it is possible to achieve a high rate of rotation of the aircraft with a relatively small force application. This may cause the pilot attempting to maintain a steady flight pattern to complain that the aircraft is too "sensitive" in yaw. At the same time, a pilot flying the same helicopter but interested in achieving rapid yaw maneuvers, as for example, covering a section with fire from fuselage mounted armament, will complain that the aircraft is not sufficiently sensitive in yaw. Despite the apparent contradiction, both complaints may be valid when each is considered in its proper context and both are related to the existing control deficiencies to which the present invention is directed.

For the first pilot, the low damping in yaw means that a relatively small control motion can build up to a relatively high rate of rotation, which he must anticipate properly. For the second pilot, the time it takes to build up to the desired velocity is significant, and, for his purposes, an overly long period of time means there is a lack of sensivity. Stated graphically in FIG. 6, velocity in yaw related to time is illustrated by curve "a." Preferably for both pilots, time "c" should be relatively small, and angle "alpha," indicating acceleration towards the final yaw velocity, should be relatively large. The present invention effects this in the manner indicated by curve "b."

The embodiment herein illustrated and described comprises, for the most part, those members commonly referred to as rods or tubes. It will, of course, be appreciated that the identical function can produce the same result in the same manner by using other types of members such as bellcranks, torque tubes, etc., and all of the above may be referred to as links or link means.

What is claimed is:

1. In a control system for aircraft, the improvement comprising:

a response lag compensation link having a first end, a second end, and means coupling said ends to cause a unit movement of said first end to result in a first movement of said second end followed by a second movement of said second end, said first movement being substantially in the same direction as and greater in amplitude than said unit movement, and said second movement being substantially in the opposite direction from said first movement, said second movement having a magnitude less than the magnitude of said first movement.

2. In a rotary wing aircraft cyclic pitch control mechanism having a cyclic pitch control stick linked to a swashplate through a plurality of links, the improvement comprising:

a response lag compensation link as one of said links, said compensation link having a first end coupled to said control stick and a second end coupled to said swashplate, means coupling said first end and said second end to cause a pre-determined movement of said second end in response to a unit movement of said first end, and means responsive to said pre-determined movement of said second end to cause a further change of position of said second end in a direction opposing said first change of position, whereby a net movement of said second end in response to a unit movement of said first end is less than said pre-determined movement.

3. The response lag compensation link of claim 2 wherein said net movement of said second end is substantially equal to said unit movement of said first end.

4. In the control mechanism for rotary wing aircraft, the improvement comprising:

a response lag compensation link having a first end, a second end, first means coupling said ends to cause a unit movement of said first end to result in a first movement of said second end, said first movement being greater in amplitude than said unit movement, and means responsive to said first movement to cause a second movement of said second end, said second movement being substantially opposed in direction to said first movement and of an amplitude such as to make the net movement of said second end substantially equal to said net movement of said first end.

5. In a rotary wing aircraft cyclic pitch control mechanism having a cyclic pitch control stick, a swashplate and a plurality of links interconnecting said cyclic pitch control stick to said swashplate, a response lag compensation link comprising:

a first member coupled to said control stick whereby a pre-determined movement of said control stick will cause a unit movement of said first member, a second member coupled to said swashplate whereby a unit movement of said second member corresponding to a unit movement of said first member will cause a pre-determined tilt of said swashplate, means coupling said first member and said second member so that a unit movement of said first member will cause a first movement of said second member equal to said unit movement plus an overshoot movement, and means responsive to said overshoot movement to move said second member in a direction and to an extent tending to cancel said overshoot movement.

6. In a rotary wing aircraft control mechanism having a pilot cyclic control member, an aerodynamic control member and a plurality of links interconnecting said pilot cyclic control member with said aerodynamic control member, as one of said plurality of links, a response lag compensation link comprising:

a first member having a first end and a second end, said first end being coupled to said control member, a second member having a first end and a second end, said second end of said second member being coupled to said aerodynamic control member, a lever having a first end and a second end, said first end of said lever being pivotally coupled to said second member, means for damping said second end of said lever, said second end of said first member being pivotally coupled to said lever at a location intermediate between said ends of said lever, and means coupling said lever and one of said members to apply a moment between said lever and said one of said members tending to maintain a pre-determined angular relation between said lever and one of said members.

7. In a rotary wing aircraft control mechanism having a pilot control member, an aerodynamic control surface and link means between said pilot control member and said aerodynamic control surface, said link means including a response lag compensation link comprising:

a first member having a first end and a second end, said first end being coupled to said control member, a second member having a first end and a second end, said second end of said second member being coupled to said aerodynamic control surface, a mixing lever having a first end and a second end, said first end of said lever being pivotally coupled to said second member, a damper linked to said second end of said lever, said second end of said first first member being pivotally coupled to said mixing lever at a location intermediate between said ends of said lever, and spring means coupling said lever and said second member to apply a moment between said lever and said second member tending to maintain a pre-determined angular relation between said lever and said second member.

8. In a rotary wing aircraft control mechanism having a pilot's directional control member, an aerodynamic directional control surface and a plurality of links between said control member and said control surface, one of said links including a response lag compensation link comprising:

a first member having a first rod portion and a lag portion extending away from the main axis of said first rod portion, said first rod portion being coupled to said control member, a second member having a second rod portion slidably coupled to said first member whereby said second member is free to move along the axis of its rod portion relative to said first member, said second rod portion being coupled to said aerodynamic directional control surface, a mixing lever having a first end and a second end, said first end of said mixing lever being pivotally coupled to said second rod portion, a damper linked to said second end of said lever, an intermediate portion of said lever, between said ends of said lever, being slidably and pivotally coupled to said leg portion of said first member, and spring means coupling said lever and one of said members to apply a moment between said lever and said one of said members tending to maintain a pre-determined angular relation between said lever and said one of said members.

9. In a rotary wing aircraft cyclic pitch control mechanism having a plurality of links between the cyclic pitch control stick and the swashplate, as one of said plurality of links, a response lag compensation link comprising:

a first member having a first rod portion and a lag portion extending away from the main axis of said first rod portion, one end of said first rod portion being coupled to said control stick, a rod having a first end slidably mounted in said first member, the main axis of said rod being substantially parallel to the main axis of said rod portion, said rod being free to move along its axis relative to said first member, said rod having a second end coupled to said swashplate, a mixing lever having a first end and a second end, said first end of said mixing lever being pivotally mounted to said rod, a damper linked to said second end of said lever, an intermediate portion of said lever, between said ends of said lever, being slidably and pivotally mounted to said leg portion of said first member, and spring means coupling said lever and said rod to apply a moment between said lever and said rod tending to maintain a pre-determined angular relation between said lever and said rod.

10. The response lag compensation link of claim 9 further characterized by means for locking said rod to said first member.

11. In a control system of aircraft, the improvement comprising:

a response lag compensation link having a first end, a second end, and means coupling said ends to cause a unit movement of said first end in a first direction to result in a first movement of said second end in said first direction followed by a second movement of said second end in a direction opposite to said first direction, said second movement of said second end being of a magnitude such that the net movement of said second end is substantially equal to said unit movement of said first end.

12. In a rotary wing aircraft control mechanism having a pilot control member, an aerodynamic control surface and link means between said pilot control member and said aerodynamic control surface, the improvement comprising:

a response lag compensation link as one of the links in said link means, said compensation link having a first end, a second end and means coupling said ends to cause a unit movement of said first end to result in a first movement of said second end followed by a second movement of said second end, said first movement being substantially in the same direction as and greater in amplitude than said unit movement, and said second movement being substantially in the opposite direction from said first movement, said second movement having a magnitude less than the magnitude of said first movement.

References Cited by the Examiner

UNITED STATES PATENTS

| | | | |
|---|---|---|---|
| 2,380,581 | 7/1945 | Prewitt | 170—160.26 |
| 2,546,881 | 3/1951 | Avery | 170—160.25 |
| 2,743,071 | 4/1956 | Kelley | 170—160.25 |
| 3,081,966 | 3/1963 | Avery. | |
| 3,118,504 | 1/1964 | Cresap | 170—160.26 X |
| 3,120,276 | 2/1964 | Culver et al. | 170—160.25 |

FOREIGN PATENTS 1,226,593  2/1960  France.

SAMUEL LEVINE, *Primary Examiner.*

JULIUS E. WEST, *Examiner.*